Dec. 11, 1945.   J. W. CLARK   2,390,921
APPLICATOR FOR FACIAL CREAMS
Filed March 23, 1943
Fig.1.
Fig.1a.
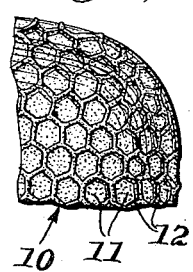
Fig.1b.
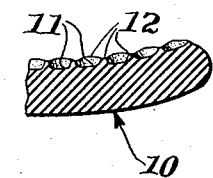
Fig.2.
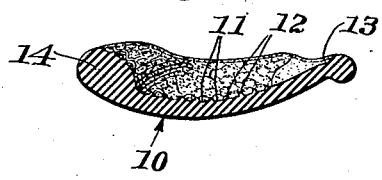
Fig.3.
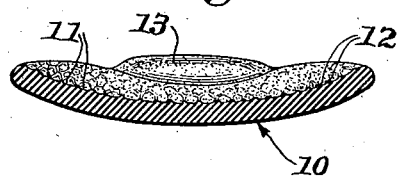
Inventor:
John W. Clark,
By Cushman, Darby & Cushman
Attorneys.

Patented Dec. 11, 1945

2,390,921

UNITED STATES PATENT OFFICE 2,390,921

APPLICATOR FOR FACIAL CREAMS

John W. Clark, Washington, D. C., assignor of one-third to Ethel Hudson Clark, Washington, D. C.

Application March 23, 1943, Serial No. 480,240

1 Claim. (Cl. 15—104)

This invention relates to applicators and massage devices, intended particularly for the application of face creams, it being here disclosed as used in connection with shaving cream.

It has for its purpose to provide an applicator to which the cream can be applied and retained during manipulation of the device, so as to insure not only complete application of the cream, but also, when used with shaving creams, to effect the softening and straightening of the beard.

Several forms of the device are shown, all of which involve the same general principle, differing only in mechanical detail.

In the drawing:

Figure 1 is a view in plan of one form of pad.

Figure 1a is an enlarged view in plan of a portion of the pad showing the rubbing surface.

Figure 1b is an enlarged sectional view of the pad to illustrate the rubbing surface shown in Figure 1a.

Figure 2 is a sectional view on substantially the line 2—2 of Figure 1, looking in the direction of the arrows.

Figure 3 is a sectional view on substantially the line 3—3 of Figure 1, looking in the direction of the arrows.

In the form of the invention shown in Figures 1, 1a, 1b, 2, and 3, a pad 10 is provided which is made of any suitable material, such as rubber, flexible plastic material, or the like, which is semi-flexible, so that in use, it can be flexed under finger pressure to the contour of the face, but which will be of sufficient rigidity and resiliency to retain and return to its original form after use. The pad 10 is in the form of a shallow cup and is of sufficient rigidity to maintain normally a cup-like form, the transverse arc of the cup being preferably somewhat less than that of its longitudinal arc, as this gives a surface easily conformable to the face. The surface of the cup will be pitted or provided with individual, separated pockets 11, which will receive and retain the cream deposited thereon and minimize its escape of flow from the edges of the pad, while retaining the cream in sufficient volume to insure complete and thorough application to the face. Ridges 12 are disposed between the pits or pockets and serve to engage the beard in the application of the cream and straighten the beard growth so as to bring it into proper shaving position. The ridges 12 are disposed at short angles or in zigzag relation to one another, so as to provide a suitable rubbing surface which will engage the beard and, further, minimize flowing and escape of the cream from the pockets, as would be the case if grooves or continuous channels were used. A portion of the pocketed and ridged surface is shown, it being understood that this configuration extends over the entire surface of the cupped portion of the pad. It will be seen that the rubbing surface of the pad is relatively smooth as the shallow pockets 11 and the slight ridges 12 do not present an abruptly interrupted surface or any depressions or upstanding portions which break up the rubbing surface or interfere in any way with the uniform flexibility of the pad. This is important in view of the fact that the pad must be of uniform contour and flexibly manipulable so as to conform to the face in applying the cream.

As is recognized, the beard ordinarily grows in a generally downward direction, and in using the applicator the massaging or rubbing will be against the beard growth, whether that be downwardly, or, as in some cases, in different directions so as to straighten the beard and bring it to a proper upstanding position.

Means for manipulating the pad are provided, these means differing in the several forms. The form shown in Figures 1, 2, and 3, is provided with manual gripping means 13 at the upper edge of the pad, so that the user can hold the extended gripping means in his fingers and move the pad 10 over the face. Said gripping means 13 is here shown as having a slightly enlarged edge portion to give a good finger hold.

To further guard against escape of creams from the cup-shaped, pocketed, and ridged pad 10, I provide an upstanding projection or rib 14 at the lower edge of the pad so that on movement of the pad over the face, excess cream escaping from the pockets 11 will back against this rib 14 and prevent too easy a flow of the cream from the pad. The rib 14, it will be seen, is thickened so as to give it greater rigidity than the semi-flexible pad, and the rib does not yield as readily during manipulation of the pad so as to prevent the escape of cream over the lower edge toward which the cream naturally flows when the pad is manipulated.

It will be observed that the semi-flexible pad which, as stated, is of cup-like form, is of such character that in use it may be manipulated by grasping the manual manipulating means shown and described and applying the fingers to the back of the pad, massaging of the face and beard softening may be readily accomplished, the pad yielding under manipulation of the fingers so as to adjust itself to the contours of the face and insure complete and effective straightening of the beard and application of the cream. Only a minimum amount of cream is necessary because the cup-shaped form and the pocketed surfaces retard the flowing or escape of cream, which occurs where continuous grooves or channels are used, and waste of cream is avoided. Further, the ridges, disposed in zig-zag relation on the rubbing surfaces and which ridges define the pits or pockets, are very effective in picking up of the beard and straightening it during application of the cream so as to bring the beard to a proper standing position for shaving.

While I have shown and described the invention particularly as being used in connection with shaving creams, it will be understood that it may be utilized in connection with the application of any facial or massaging creams or lotions.

I claim:

An applicator for facial creams comprising a semi-flexible pad having a concave rubbing face for retaining the cream deposited thereon, said pad being provided with spaced longitudinally extending lower and upper edges, the transverse arc of the concave face being of shorter radius than that of its longitudinal arc so as to conform to the face of the user, said concave face having a relatively smooth rubbing surface of substantially uniform contour made up of alternate closed shallow pockets to receive the cream and slight ridges uniformly distributed over the rubbing surface, the ridges being disposed to provide zig-zag beard-engaging and straightening means, a thickened cream overflow retaining rib at the lower longitudinal edge of said pad, said rib being of greater rigidity than the remaining portion of the pad so as not to yield as readily during manipulation and shaped to prevent the escape of cream over the lower longitudinal edge towards which the cream flows when the pad is manipulated, and means extending outwardly from the upper longitudinal edge of the pad for manually operating the same.

JOHN W. CLARK.